2,979,540
PROCESS FOR THE PREPARATION OF ALIPHATIC BROMIDES

Arthur A. Asadorian, Midland, and George A. Burk, Bay City, Mich., assignors to The Dow Chemical Company, Midland, Mich., a corporation of Delaware
No Drawing. Filed Apr. 7, 1958, Ser. No. 726,629
4 Claims. (Cl. 260—654)

The present invention relates to aliphatic bromides and is more particularly concerned with a new and novel process for their preparation from chloroolefines.

It has been found that haloolefines or olefines can be selectively brominated and/or hydrobrominated conveniently and readily with hydrogen bromide in the presence of aqueous hydrobromic acid. The reaction proceeds smoothly with the production of the desired product in a reaction mixture from which it can be easily separated, at temperatures from about $-10°$ C. to about $140°$ C.

In carrying out the method of the present invention the appropriate olefine, i.e., olefines and haloolefines, is mixed with aqueous hydrobromic acid and hydrogen bromide gas bubbled into the mixture. It is to be understood that the aqueous hydrobromic acid may be added as such or formed in situ. The reaction proceeds smoothly at temperatures of from $-10°$ C. to about $140°$ C. The temperature of the reaction mixture conveniently may be controlled by external cooling or heating. The rate of addition of the hydrogen bromide gas is not critical but is preferably introduced at a rate of from 1.0 to 10 percent per hour of the theoretical required and it is further desirable that the mixture be stirred continuously. Upon completion of the reaction the desired product may be separated by fractional distillation if a liquid or filtration and recrystallization from suitable organic solvents if a solid.

The following examples are illustrative of the present invention but are not to be construed as limiting:

Example 1

500 cc. (465 grams) of allyl chloride mixed with 250 cc. of aqueous 48 percent hydrobromic acid was maintained at a temperature of between $0°$ and $5°$ C. by external cooling in an ice-water bath. Hydrogen bromide gas was fed to the reaction mixture at a rate of 2.2 percent of theoretical per hour until 467 liters (STP) (1683 grams; 20.8 moles) had been introduced. Samples of the reaction mixture taken during the run had the compositions tabulated below:

| Total Time, Hours | Temp., °C. | Composition in Percent by Weight | | | | |
|---|---|---|---|---|---|---|
| | | Allyl Chloride | Allyl Bromide | Propylene Chloro-bromide | Propylene-dibromide | Trimethylene Chloro-bromide |
| 2½ | −5 to 0 | 87 | 1 | 8 | | |
| 4 | −2 to 0 | 80 | 1 | 14 | | |
| 11 | −5 to 0 | 65 | 1.5 | 31 | | |
| 19 | −5 to 0 | 33 | 2 | 45 | 1 | 9 |
| 27½ | −5 to +5 | 17 | 1.5 | 60 | 4 | 10 |
| 36 | −5 to +8 | 18 | | 69 | | 11 |
| 44¼ | −5 to 0 | 5.7 | 4.4 | 67.9 | 5.9 | 12 |

Example 2

In a similar manner employing 1300 cc. (1217 grams) of allyl chloride, 510 cc. of aqueous 48 percent hydrobromic acid, and 861 liters (STP) (3112 grams) of hydrogen bromide at a feed rate of 2.1 percent of the theoretical per hour the following results were obtained:

| Total Time, Hours | Temp., °C. | Composition in Percent by Weight | | | |
|---|---|---|---|---|---|
| | | Allyl Chloride | 1,2-Propylene Chloro-Bromide | Propylene-Dibromide | Trimethylene Chloro-Bromide |
| 6½ | 18–20 | 86 | 10 | | |
| 10¾ | 20–21 | 67 | 24 | | |
| 28½ | 20–22 | .20 | 44 | 9 | 9 |
| 36½ | 18–21 | 4 | 57 | 13 | 7 |
| 43½ | 19 | 2 | 60 | 15 | 9 |
| 52¼ | 19–21 | 0 | 60.5 | 21 | 8.5 |
| 60¾ | 19–21 | 0 | 52 | 25 | 8 |

Example 3

A mixture of 100 ml., 71.5 g., n-octene-1 and an equal volume of 48 percent hydrobromic acid was hydrobrominated by bubbling 73 l. (STP) of HBr gas over a 2¼ hour period at 20–46° C. into the octene mixture. This gave 123 g. of crude oil which upon washing with cold water and excess dilute carbonate solution and drying with anhydrous $CaCl_2$ gave an amber oil testing 1.116 sp.gr. at 21° C. analyzing:

Product: Yield
1-bromooctane _____ 15 percent
2-bromooctane _____ 85 percent for a 97.5 percent yield based on the n-octene-1 employed.

Examples 4 and 5

In the manner of the foregoing examples, employing the following reactants and proportions, the following compounds were obtained in the indicated yields.

| Reactant | Amount, Grams | Hydrogen Bromide | Aqueous 48 percent HBr, cc. | Time in Hours | Temp., °C. | Product |
|---|---|---|---|---|---|---|
| 4. Allyl chloride | 564 | 640 g., 7.9 moles 177 l. (STP). | 600 | 13½ | 43–54 | Allyl bromide, 54 percent. |
| 5. Allyl chloride | 564 | 930 g.; 258 l. (STD) 1.4 moles. | 600 | 12¾ | 44–81 | Allyl bromide, 31 percent. Propylene dibromide, 64 percent. |

Example 6

In the manner of the foregoing examples employing 750 cc. (705 grams) of allyl chloride and 500 cc. of aqueous 48 percent hydrobromic acid and a total of 775 liters (STP) (34.6 moles) of hydrogen bromide there was obtained the following results

|  | Composition in Percent by Weight | | |
|---|---|---|---|
|  | 25¾ hours, 25° C. | 33½ hours, 25° C. | 46⅙ hours, 105° C. |
| Allyl chloride | 0 | 0 | 0 |
| Allyl bromide | 4 | 1 | 0 |
| Propylene dibromide | 41 | 46 | 58 |
| Trimethylene dibromide | | 11 | 10 |

*Example 7*

In another run, similar to Example 6, the following results were obtained employing 465 g. of allyl chloride, 500 cc. of an aqueous 48 percent hydrobromic acid, and 17 g. Fe pwd. and total of 420 liters (STP) (18.9 moles) of hydrogen bromide gas. The temperature rose from 44° to 56° C. in 3¼ hours. There was obtained as a result of the operations a mixture having the compositions tabulated below.

| Total Run in Hours | Temp., °C. | Composition in Percent by Weight | | |
|---|---|---|---|---|
|  |  | Allyl Chloride | Allyl Bromide | Propylene Dibromide |
| 3¼ | 44-56 | 20 | 80 | |
| 7 | 56 | 5 | 95 | |
| 13½ | 64 | | 36 | 64 |
| 21½ | 64 | | | 100 |
| 23 | 62 | | | 100 |

Other olefinic compounds which can be employed in accordance with the present invention are for example, propene, butene, hexene, heptene, 2-methyl-1-propene, 4-chloro-2-butene, 2-pentene, 2-methyl 1-butene, 4-chloro-2-methyl-2-butene, 3-methyl-1-butene, 1-chloro-3-methyl-2-butene, and the like.

We claim:

1. A process for preparing bromoaliphatic compounds from olefinic chloro compounds containing no functional groups reactive with HBr other than halogen which comprises contacting said olefinic chloro compound with hydrogen bromide and aqueous hydrobromic acid at a temperature of from −10° to 140° C.

2. A process for preparing bromo-olefinic compounds from chloro olefins which comprises reacting by contacting said chloro olefin containing no functional groups reactive with HBr, other than halogen with hydrogen bromide in the presence of aqueous hydrobromic acid at a temperature of from 40° to 140° C.

3. A process for hydrobrominating an olefinic hydrocarbon for the preparation of a paraffinic bromide which comprises reacting by contacting said olefinic hydrocarbon with hydrogen bromide in the presence of aqueous hydrobromic acid and at a temperature from −10° to 140° C.

4. A process for making chlorobromoaliphatic compounds which comprises contacting a chloro olefinic compound containing no functional groups reactive with HBr, other than halogen with hydrogen bromide and aqueous hydrobromic acid at a temperature of from −10° to 40° C.

References Cited in the file of this patent
UNITED STATES PATENTS

| | | |
|---|---|---|
| 2,412,882 | Gardenier | Dec. 17, 1946 |
| 2,553,518 | Lake et al. | May 15, 1951 |
| 2,563,050 | Linn et al. | Aug. 7, 1951 |
| 2,605,294 | Barnhart | July 29, 1952 |